(12) United States Patent
Bass

(10) Patent No.: US 6,946,285 B2
(45) Date of Patent: Sep. 20, 2005

(54) ARRAYS WITH ELONGATED FEATURES

(75) Inventor: Jay K. Bass, Mountain View, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 155 days.

(21) Appl. No.: 10/135,944

(22) Filed: Apr. 29, 2002

(65) Prior Publication Data

US 2003/0203368 A1 Oct. 30, 2003

(51) Int. Cl.[7] .......................... C07H 21/04; C12Q 1/68
(52) U.S. Cl. .................. 435/287.2; 435/91.1; 435/91.2; 435/6; 435/5; 435/7.1; 536/23.1
(58) Field of Search .............................. 435/287.2, 91.1, 435/6, 5, 7.1, 91.2; 536/23.1

(56) References Cited

U.S. PATENT DOCUMENTS

| | | | |
|---|---|---|---|
| 5,464,945 A | * 11/1995 | Reynolds et al. | 536/24.31 |
| 6,043,039 A | * 3/2000 | Bar-Am et al. | 435/6 |
| 6,180,351 B1 | 1/2001 | Cattell | |
| 6,362,004 B1 | * 3/2002 | Noblett | 436/43 |
| 6,403,957 B1 | 6/2002 | Fodor et al. | |
| 6,420,180 B1 | 7/2002 | Bass | |
| 6,577,956 B1 | * 6/2003 | Shams | 702/19 |
| 2001/0026919 A1 | * 10/2001 | Chenchik et al. | 435/6 |

OTHER PUBLICATIONS

Pease et al. "Light–geneated oligonucleotide arrays for rapid DNA sequence analysis." PNAS, vol. 91, pp. 5022–5026, May 1994.*

"Development of a cDNA Microarray Manufacturing Platform Utilizing a Thermal Ink Jet Deposition System", Wiest et al., Poster displayed at Oct. 1999 conference of the Institute for Genomic Research.

* cited by examiner

*Primary Examiner*—Jeanine A. Goldberg
(74) *Attorney, Agent, or Firm*—Gordon Stewart

(57) ABSTRACT

Arrays having multiple biopolymer features on a substrate, including elongated features which have a length/width ratio greater than 1.3 or more. Such arrays may be oriented in various directions and of shapes described, and fabricated using apparatus, methods, or computer program products of the invention.

30 Claims, 6 Drawing Sheets

FIG. 5
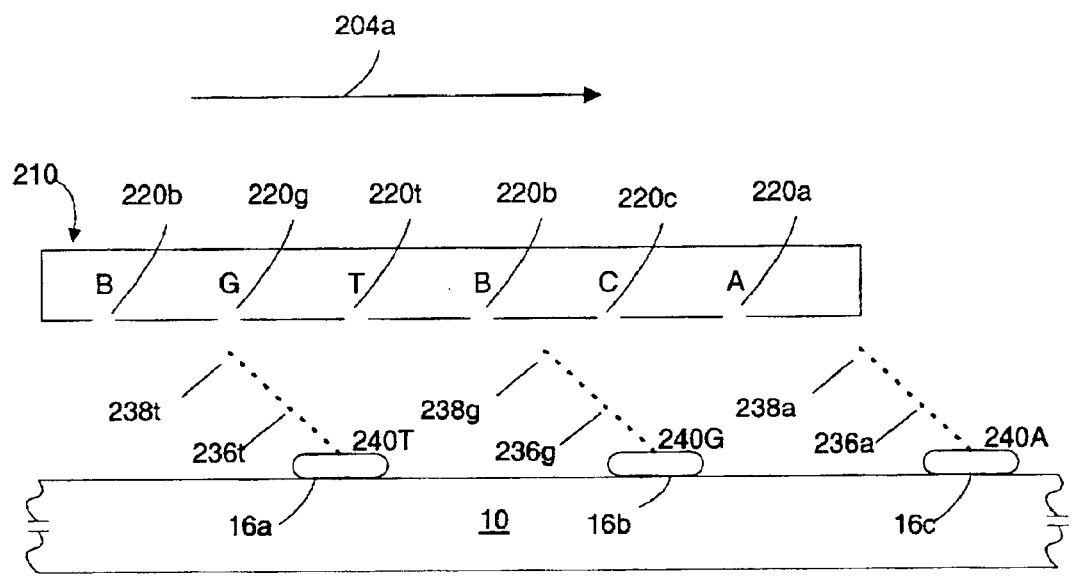
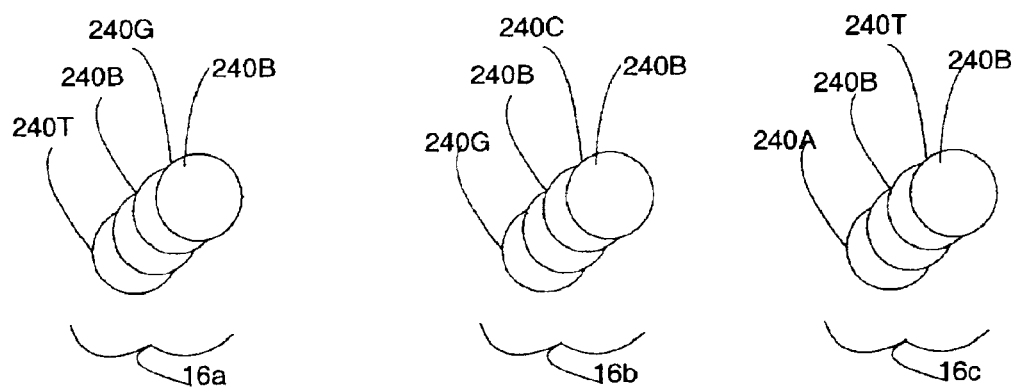
FIG. 6

ARRAYS WITH ELONGATED FEATURES

FIELD OF THE INVENTION

This invention relates to arrays, particularly biopolymer arrays such as DNA or protein arrays, which are useful in diagnostic, screening, gene expression analysis, and other applications.

BACKGROUND OF THE INVENTION

In the following discussion and throughout the present application, no cited reference is admitted to be prior art to the present application.

Biopolymer arrays, such as polynucleotide arrays and peptide array, are known and may be used, for example, as diagnostic or screening tools. Such arrays include regions (sometimes referenced as spots or features) of usually different sequence polynucleotides or peptides arranged in a predetermined configuration on a substrate. The array is "addressable" in that different features have different predetermined locations ("addresses") on a substrate carrying the array.

Biopolymer arrays can be fabricated using in situ synthesis methods or deposition of the previously obtained biopolymers. The in situ fabrication methods include those described in U.S. Pat. No. 5,449,754 for synthesizing peptide arrays, and in U.S. Pat. No. 6,180,351 and WO 98/41531 and the references cited therein for synthesizing polynucleotide arrays. In situ methods also include photolithographic techniques such as described, for example, in WO 91/07087, WO 92/10587, WO 92/10588, and U.S. Pat. No. 5,143,854. The deposition methods basically involve depositing biopolymers at predetermined locations on a substrate which are suitably activated such that the biopolymers can link thereto. Biopolymers of different sequence may be deposited at different feature locations on the substrate to yield the completed array. Procedures known in the art for deposition of biopolymers, particularly DNA such as whole oligomers or cDNA, are described, for example, in U.S. Pat. No. 5,807,522 (touching drop dispensers to a substrate), and in PCT publications WO 95/25116 and WO 98/41531, and elsewhere (use of a pulse jet in the form of a piezoelectric inkjet head).

The in situ method for fabricating a polynucleotide array typically follows, at each of the multiple different addresses at which features are to be formed, the same conventional iterative sequence used in forming polynucleotides from nucleoside reagents on a support by means of known chemistry. This iterative sequence can be considered as multiple ones of the following attachment cycle at each feature to be formed: (a) coupling an activated selected nucleoside (a monomeric unit) through a phosphite linkage to a functionalized support in the first iteration, or a nucleoside bound to the substrate (i.e. the nucleoside-modified substrate) in subsequent iterations; (b) optionally, blocking unreacted hydroxyl groups on the substrate bound nucleoside (sometimes referenced as "capping"); (c) oxidizing the phosphite linkage of step (a) to form a phosphate linkage; and (d) removing the protecting group ("deprotection") from the now substrate bound nucleoside coupled in step (a), to generate a reactive site for the next cycle of these steps. The coupling can be performed by depositing drops of an activator and phosphoramidite at the specific desired feature locations for the array. Capping, oxidation and deprotection can be accomplished by treating the entire substrate ("flooding") with a layer of the appropriate reagent. The functionalized support (in the first cycle) or deprotected coupled nucleoside (in subsequent cycles) provides a substrate bound moiety with a linking group for forming the phosphite linkage with a next nucleoside to be coupled in step (a). Final deprotection of nucleoside bases can be accomplished using alkaline conditions such as ammonium hydroxide, in another flooding procedure in a known manner. Conventionally, a single pulse jet or other dispenser is assigned to deposit a single monomeric unit.

The foregoing chemistry of the synthesis of polynucleotides is described in detail, for example, in Caruthers, Science 230: 281–285, 1985; Itakura et al., Ann. Rev. Biochem. 53: 323–356; Hunkapillar et al., Nature 310: 105–110, 1984; and in "Synthesis of Oligonucleotide Derivatives in Design and Targeted Reaction of Oligonucleotide Derivatives", CRC Press, Boca Raton, Fla., pages 100 et seq., U.S. Pat. No. 4,458,066, U.S. Pat. No. 4,500,707, U.S. Pat. No. 5,153,319, U.S. Pat. No. 5,869,643, EP 0294196, and elsewhere The phosphoramidite and phosphite triester approaches are most broadly used, but other approaches include the phosphodiester approach, the phosphotriester approach and the H-phosphonate approach. The substrates are typically functionalized to bond to the first deposited monomer. Suitable techniques for functionalizing substrates with such linking moieties are described, for example, in Southern, E. M., Maskos, U. and Elder, J. K., Genomics, 13, 1007–1017, 1992.

In the case of in situ array fabrication, different monomers and an activator may be deposited at different addresses on the substrate during any one cycle so that the different features of the completed array will have different desired biopolymer sequences. One or more intermediate further steps may be required in each cycle, such as the conventional oxidation, capping and washing steps in the case of in situ fabrication of polynucleotide arrays (again, these steps may be performed in flooding procedure).

Further details of large scale fabrication of biopolymer arrays by depositing either previously obtained biopolymers or by the in situ method, are disclosed in U.S. Pat. No. 6,242,266, U.S. Pat. No. 6,232,072, U.S. Pat. No. 6,180,351, and U.S. Pat. No. 6,171,797.

In array fabrication, the quantities of DNA available for the array are usually very small and expensive. Sample quantities available for testing are usually also very small and it is therefore desirable to simultaneously test the same sample against a large number of different probes on an array. These conditions require the manufacture and use of arrays with large numbers of very small, closely spaced features. This then leads to arrays which are time consuming and costly to manufacture.

The arrays, when exposed to a sample, will exhibit a binding pattern. The array can be read by observing this binding pattern by, for example, labeling all targets such as polynucleotide targets (for example, DNA), in the sample with a suitable label (such as a fluorescent compound), scanning an illuminating beam across the array one pixel at a time and accurately detecting the fluorescent signal from the different features of the array. Techniques and apparatus for scanning chemical arrays are described, for example, in U.S. Pat. No. 5,763,870 and U.S. Pat. No. 5,945,679. Assuming that the different sequence polynucleotides were correctly deposited in accordance with the predetermined configuration, then the observed binding pattern will be indicative of the presence and/or concentration of one or more polynucleotide components in the sample. Peptide or arrays of other chemical moieties can be used in a similar manner.

In interpreting the data from an array (a process which may be referenced as "feature extraction") it is necessary to decide if a signal for a given pixel should be counted as part of an array feature and, if so, which feature, or whether the pixel represents background signal (such as from areas on the substrate not carrying any biopolymer probes. With thousands of features in an array, it is usually best that an automated image analysis be performed to first identify where a feature is located, then to identify its boundary. Given that the pixel signal may decrease gradually over several pixels near the boundary and not necessarily evenly around it, this task may not be precise. This may be particularly true when a feature produces only a weak signal. One way to facilitate this task is to assume the feature has a conventional shape, for example to assume that the features are circular. When arrays are made by drop deposition processes, this is usually a good assumption since drops deposited onto a surface will typically form a circular shape.

It would be desirable then, to manufacture biopolymer arrays at low cost while permitting feature extraction to be readily performed.

SUMMARY OF THE INVENTION

The present invention realizes that arrays can be fabricated at a high speed by drop deposition processes if the features do not have to be round. The present invention further realizes that feature extraction techniques do not necessarily need circular features such that high speed fabrication processes of the foregoing type can be implemented.

The present invention then, provides an array having multiple biopolymer features on a substrate, including elongated features which have a length/width ratio which may be equal to or greater than 1.2 or 1.3. Such a length/width ratio may be equal to or greater than any one of 1.5, 1.6, 1.7, 1.8, 2, 2.2, 2.4, 2.6, 2.8, 3, or even equal to or greater than any of 3.2, 3.5, or 4 or 5. The majority of features on the array (that is, greater than 50%) may be such elongated features, or such feature may even make up at least 60%, 70%, 80%, 90% or at least 98% (or all) of the total number of features on the array. The lengths of the elongated features (for example, at least 50%, 70%, or at least 90% of them, or all of them) may be oriented in a common direction.

The present invention further provides a method of fabricating arrays of the present invention. This method includes, for each of multiple features, depositing multiple drops at least some (and optionally, multiple ones) of which carry the biopolymer or a biopolymer precursor, onto the substrate from a drop deposition head system while the head system is spaced from the substrate. The head system is moved with respect to the substrate. This procedure is executed so as to fabricate the array with the elongated features. The desired degree of elongation may can be controlled, for example, by adjusting the rate of drop deposition and head system movement velocity. In executing a method of the present invention, a head system may be used which has multiple pulse jets, and the multiple drops for a feature may be deposited from a same pulse jet while the head system is moved with respect to the substrate. In one aspect the multiple drops of liquid deposited for each feature include at least one drop of a biopolymer precursor and at least one drop of an activator which causes the biopolymer precursor to link to a moiety on the substrate. Each cycle of deposition and head system movement may be repeated one or more times for each of the elongated features.

An apparatus for fabricating an array having multiple biopolymer features on a substrate, is also provided by the present invention. Such an apparatus may include a substrate holder on which the substrate can be mounted. A deposition head system of the apparatus is provided which deposits drops onto a mounted substrate while being spaced from it. A transporter system moves the deposition head system with respect to a mounted substrate. A processor which controls the deposition head system and transporter system so as to fabricate an array of the present invention, for example by a method of the present invention.

A computer program product is also provided by the present invention, which may be used with an apparatus for fabricating an array of the present invention, such as an apparatus of the present invention. The program product comprises a computer readable storage medium having a computer program stored thereon which controls the apparatus (such as a transporter system for the head system, and multiple pulse jets of the deposition head system) to perform a method of the present invention.

The various aspects of the present invention can provide any one or more of the following and/or other useful benefits. For example, the speed at which a drop deposition head moves relative to the surface can be increased thereby increasing the speed of array fabrication. Some features can be oriented in different directions from other for easier identification. A deposition system can be used with nozzles in rows parallel to the direction of travel of the head which can also provide drops for the same feature during a same cycle.

BRIEF DESCRIPTION OF THE DRAWINGS

FIG. 5 illustrates movement of a drop deposition head system and coordinated ejection of drops during one cycle to link a first nucleotide on some features of the array of FIG. 3;

FIG. 6 schematically illustrates the sequence of drop deposition during two cycles to link the first two nucleotides to some of the features of the array of FIG. 3 using the procedure illustrated in FIG. 5;

To facilitate understanding, identical reference numerals have been used, where practical, to designate identical elements that are common to the figures.

DETAILED DESCRIPTION OF EMBODIMENTS OF THE INVENTION

Figure 1:
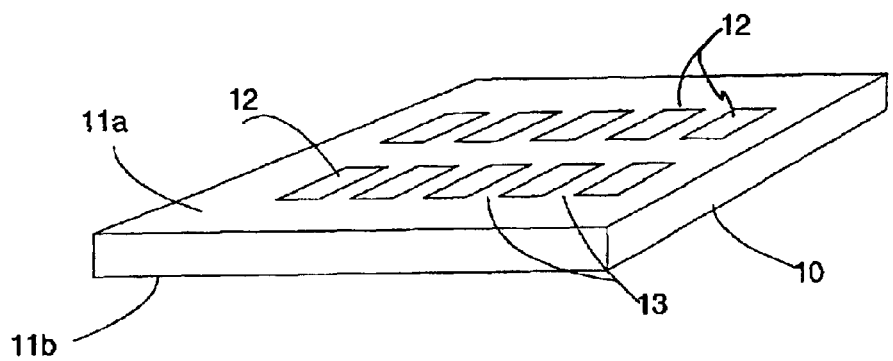
FIG. 1 illustrates a substrate carrying multiple arrays, such as may be fabricated by methods of the present invention.

In the present application, unless a contrary intention appears, the following terms refer to the indicated characteristics. A "biopolymer" is a polymer of one or more types of repeating units. Biopolymers are typically found in biological systems and particularly include polysaccharides (such as carbohydrates), and peptides (which term is used to include polypeptides and proteins) and polynucleotides as well as their analogs such as those compounds composed of or containing amino acid analogs or non-amino acid groups, or nucleotide analogs or non-nucleotide groups. This includes polynucleotides in which the conventional backbone has been replaced with a non-naturally occurring or synthetic backbone, and nucleic acids (or synthetic or naturally occurring analogs) in which one or more of the conventional bases has been replaced with a group (natural or synthetic) capable of participating in Watson-Crick type hydrogen bonding interactions. Polynucleotides include single or multiple stranded configurations, where one or more of the strands may or may not be completely aligned with another. A "nucleotide" refers to a sub-unit of a nucleic acid and has a phosphate group, a 5 carbon sugar and a nitrogen containing base, as well as functional analogs (whether synthetic or naturally occurring) of such sub-units which in the polymer form (as a polynucleotide) can hybridize with naturally occurring polynucleotides in a sequence specific manner analogous to that of two naturally occurring polynucleotides. For example, a "biopolymer" includes DNA (including cDNA), RNA, oligonucleotides, and PNA and other polynucleotides as described in U.S. Pat. No. 5,948,902 and references cited therein (all of which are incorporated herein by reference), regardless of the source. An "oligonucleotide" generally refers to a nucleotide multimer of about 10 to 100 nucleotides in length, while a "polynucleotide" includes a nucleotide multimer having any number of nucleotides. A "biomonomer" references a single unit, which can be linked with the same or other biomonomers to form a biopolymer (for example, a single amino acid or nucleotide with two linking groups one or both of which may have removable protecting groups). A "biopolymer precursor" is any sub-unit of the final biopolymer such that linked biopolymer precursors can form the biopolymer, and includes a biomonomer although it also includes a multimer. A biomonomer fluid or biopolymer fluid reference a liquid containing either a biomonomer or biopolymer, respectively (typically in solution).

A "drop" is a small amount of liquid traveling in a space, and while often approximately spherical if no external forces are acting upon it, may have other shapes depending upon those other forces. In the present case, a drop which has contacted a substrate is often referred to as a deposited drop, although sometimes it will be simply referenced as a drop when it is understood that it was previously deposited. Detecting a drop "at" a location, includes the drop being detected while it is traveling between a dispenser and that location, or after it has contacted that location (and hence may no longer retain its original shape) such as capturing an image of a drop on the substrate after it has assumed an approximately circular shape of a deposited drop. A "pulse jet" is a device which can dispense drops in the formation of an array. Pulse jets operate by delivering a pulse of pressure to liquid adjacent an outlet or orifice (such as by a piezoelectric or thermoelectric element positioned near the orifice) such that a drop will be dispensed therefrom.

A "set" of anything (such as a set of drops), may contain only one, or only two, or three, or any number of multiple drops (although where "drops" are referenced in relation to a set implies the set in that case includes multiple drops).

An "array", unless a contrary intention appears, includes any one-, two- or three-dimensional arrangement of addressable regions bearing a particular chemical moiety or moieties (for example, biopolymers such as polynucleotide sequences) associated with those regions. An array is "addressable" in that it has multiple regions of different moieties (for example, different polynucleotide sequences) such that a region (also referenced as a "feature" or "spot" of the array) at a particular predetermined location (an "address") on the array will detect a particular target or class of targets (although a feature may incidentally detect non-targets of that feature). Note that the finite small areas on the array which can be illuminated and from which any resulting emitted light can be simultaneously (or shortly thereafter) detected, define pixels which are typically substantially smaller than a feature (typically having an area about $\frac{1}{10}$ to $\frac{1}{100}$ the area of a feature). Array features are typically, but need not be, separated by intervening spaces. In the case of an array, the "target" will be referenced as a moiety in a mobile phase (typically fluid), to be detected by probes ("target probes") which are bound to the substrate at the various features. However, either of the "target" or "target probes" may be the one which is to be evaluated by the other (thus, either one could be an unknown mixture of polynucleotides to be evaluated by binding with the other). An "array layout" refers to one or more characteristics of the features, such as feature positioning on the substrate, one or more feature dimensions, and an indication of a moiety at a given location. "Hybridizing" and "binding", with respect to polynucleotides, are used interchangeably. During a "cycle" for forming a given feature, typically at least 50% (and more typically at least 70%, 80% or more preferably at least 90% or 95%) of moieties bound to a substrate surface available to link with a deposited monomeric unit or previously obtained complete moiety for forming the desired feature, actually link to such deposited monomeric unit or complete moiety.

When one item is indicated as being "remote" from another, this is referenced that the two items are at least in different buildings, and may be at least one mile, ten miles, or at least one hundred miles apart. "Communicating" information references transmitting the data representing that information as electrical signals over a suitable communication channel (for example, a private or public network). "Forwarding" an item refers to any means of getting that item from one location to the next, whether by physically transporting that item or otherwise (where that is possible) and includes, at least in the case of data, physically transporting a medium carrying the data or communicating the data. It will also be appreciated that throughout the present application, that words such as "front", "back", and the like are used in a relative sense only.

A "processor" references any hardware and/or software combination which will perform the functions required of it. For example, any processor herein may be a programmable digital microprocessor such as available in the form of a mainframe, server, or personal computer (desktop or portable). Where the processor is programmable, suitable programming can be communicated from a remote location to the processor, or previously saved in a computer program product (such as a portable or fixed computer readable storage medium, whether magnetic, optical or solid state device based). For example, a magnetic or optical disk may carry the programming, and can be read by a suitable disk reader communicating with each processor at its corresponding station. Reference to a singular item, includes the possibility that there are plural of the same items present. "May" means optionally. Methods recited herein may be carried out in any order of the recited events which is logically possible, as well as the recited order of events. All patents and other references cited in this application, are incorporated into this application by reference except insofar as they may conflict with those of the present application (in which case the present application prevails).

Figure 2:
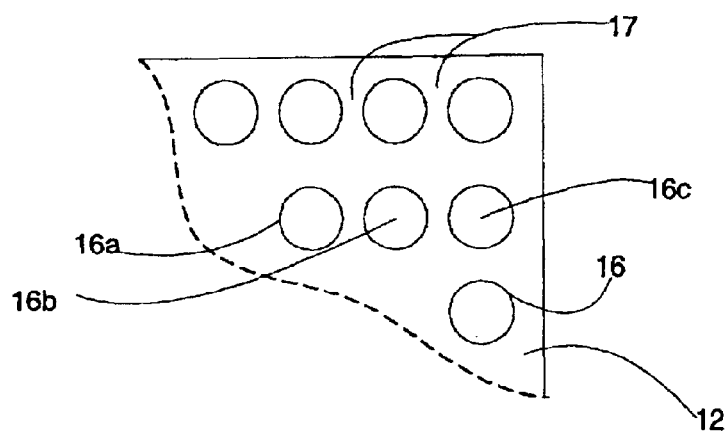
FIG. 2 is an enlarged view of an array on FIG. 1 which has a conventional feature shape.
Figure 3:
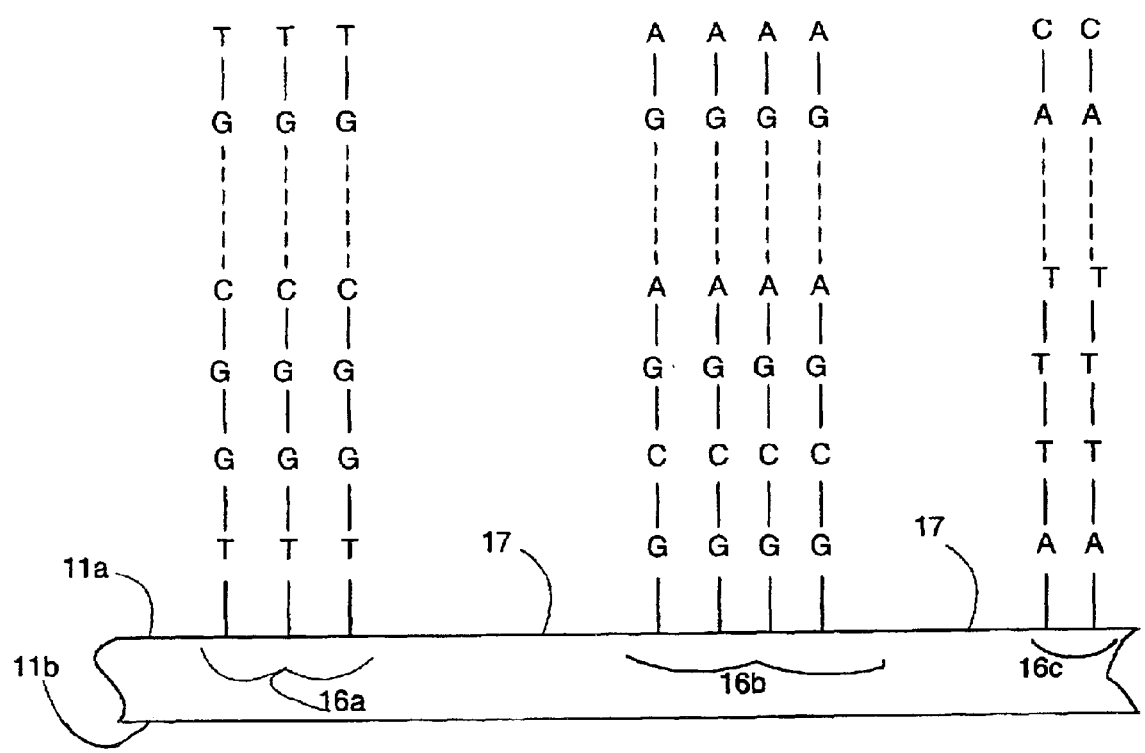
FIG. 3 is an enlarged illustration of a portion of the array in FIG. 2 or FIG. 4.

Referring first to FIGS. 1–3, these illustrate arrays of conventional configuration. In these FIGS. a planar substrate 10 carries one or more arrays 12 disposed across a front surface 11a of substrate 10 and separated by inter-array areas 13. A back side 11b of substrate 10 does not carry any arrays 12. The arrays on substrate 10 can be designed for testing against any type of sample, whether a trial sample, reference sample, a combination of them, or a known mixture of polynucleotides (in which latter case the arrays may be composed of features carrying unknown sequences to be evaluated). While ten arrays 12 are shown in FIG. 1 on a substrate 10, any number of arrays 12 may be present on substrate 10. Similarly, substrate 10 may be of any shape, and any apparatus used with it adapted accordingly. Depending upon intended use, any or all of arrays 12 may be the same or different from one another and each will contain multiple spots or features 16 of biopolymers in the form of polynucleotides. In the case where arrays 12 are formed by the conventional in situ or deposition of previously obtained moieties, as described above, by depositing for each feature a droplet of reagent in each cycle such as by using a pulse jet such as an inkjet type head, interfeature areas 17 will typically (but not essentially) be present which do not carry any polynucleotide. It will be appreciated though, that the interfeature areas 17 could be of various sizes and configurations. It will also be appreciated that there need not be any space separating arrays 12 from one another. Each feature carries a predetermined polynucleotide (which includes the possibility of mixtures of polynucleotides). As per usual, A, C, G, T represent the usual nucleotides. It will be understood that there is usually a linker molecule (not shown) of any known types between the front surface 11a and the first nucleotide.

FIG. 3 in particular illustrates the circular features 16 of a conventional ideal array, with each feature 16 being uniform in shape, size and composition, and the features being regularly spaced. Note that features 16a, 16b, 16c have polynucleotides of different sequences.

Figure 4:
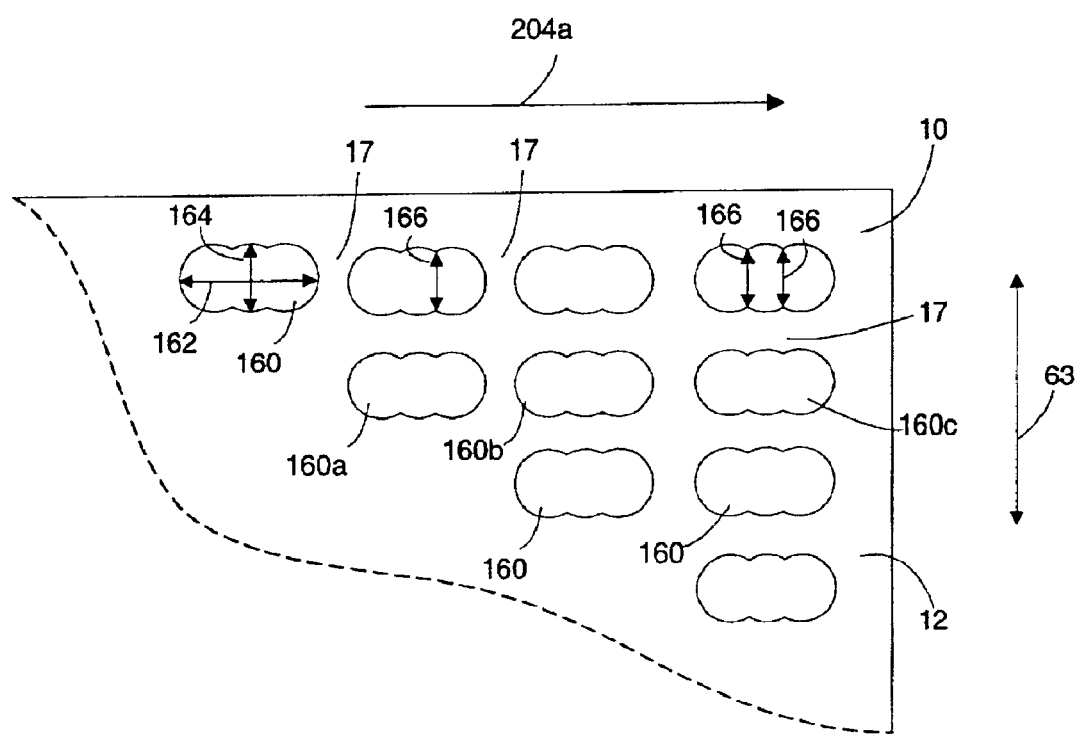
FIG. 4 is a view similar to FIG. 2 but showing an array of the present invention with elongated features.

Arrays of the present invention may have any characteristics of the arrays illustrated in FIGS. 1–3 except the features 160 are elongated as shown in FIG. 4. That is, they have a length 162 which is greater than a width 164. For example, the length to width ratio may be greater than 1.3, 1.4, 1.5, 1.6, 1.8, 2, 2.2, 2.4, 2.6, 2.8, 3, 3.2, 3.5, 4, or 4.5, or even greater than 5. By "length" in this context is referenced the longest linear dimension of a feature 160 and which will be taken to define one axis, while the "width" will be a maximum linear dimension along another axis orthogonal to the one axis along which length is measured. It will also be seen in FIG. 4 that due to the speed of a deposition head and frequency at which drops are deposited from it, features 160 have two narrower portion 166 each of which is intermediate two wider portions. In this context the "narrow" and "wider" portion dimensions are measured perpendicular to the length of the features. Such arrays of the present invention may contain at least ten features 160, or at least one hundred features, at least one thousand, five thousand, or even at least ten thousand such features 160. All of the features 16 may be of different composition, or some could be the same (for example, when any repeats of each feature composition are excluded the remaining features may account for at least 5%, 10%, 20%, or 50% of the total number of features). Each features 160 carries probes in the form of a one moiety or a mixture of moieties, which in the case of each feature 160 is a polynucleotide having a particular sequence. Interfeature areas 17 do not carry any moieties of a type the same as the features 16 (for example, no polynucleotides in the case of features 160 carrying polynucleotides). Features 160 may have lengths of less than 1 cm, less than 1 mm, less than 200 $\mu$m, or even less than 100 $\mu$m. The area of each feature 160 may be at least 15 or 75 $\mu m^2$, and less than 2.0 $cm^2$. In embodiments where very small spot sizes or feature sizes are desired, each of the features 160 may have areas of at least 1.0 $\mu m^2$ and less than 1.0 $mm^2$, usually less than 0.2 $mm^2$, and more usually less than 0.05 $mm^2$. The probes of features 160 are typically linked to substrate 10 through a suitable linker, not shown, in a similar manner as those of FIG. 3.

While substrate 10 in FIG. 4 is planar and rectangular in form, other shapes (for example, circular) could be used with housing 34 being adjusted accordingly. In many embodiments, substrate 10 will be shaped generally as a planar, rectangular solid, having a length in the range about 4 mm to 200 mm, usually about 4 mm to 150 mm, more usually about 4 mm to 125 mm; a width in the range about 4 mm to 200 mm, usually about 4 mm to 120 mm and more usually about 4 mm to 80 mm; and a thickness in the range about 0.01 mm to 5.0 mm, usually from about 0.1 mm to 2 mm and more usually from about 0.2 to 1 mm. However, larger substrates can be used. Substrate 10 could also have a three-dimensional shape with irregularities in first surface 11a. Substrates of other configurations and equivalent areas can be chosen. The configuration of the array may be selected according to manufacturing, handling, and use considerations. Typical non-porous substrates 10 include glass, silica, and rigid and flexible plastics. However, other materials can be used which provide physical support for the deposited material and endure the conditions of the deposition process and of any subsequent treatment or handling, or processing that may be encountered in the use of the particular array. Ideally, any material used should exhibit a low level of non-specific binding during hybridization events and, for situations where the array is read by detecting fluorescence in response to an interrogating light, should also ideally exhibit low intrinsic fluorescence and be transparent to visible and/or UV light.

A method of fabricating an array of the present invention will now be described with reference to FIGS. 7 and 8A–8C, versus a method of fabricating a conventional array shown in FIGS. 5 and 6. For the purposes of the discussions below, it will be assumed (unless the contrary is indicated) that the array being formed in any case is a polynucleotide array formed by the in situ method using pulse jet dispensers. However, the applicability of the method to arrays of other polymers or chemical moieties generally, whether formed by multiple cycle in situ methods or deposition of previously obtained moieties (this latter can be considered essentially as a one cycle process), or using other procedures or types of dispensers, will be understood from these discussions. In the discussion below, a, c, g, t or A, C, G, T by themselves or as number suffixes, represent adenosine, cytidine, guanosine, and thymidine, phosphoramidite aqueous solutions which nucleoside phosphoramidites will only become attached to a location at which it is deposited, upon activation by a suitable activator (represented by b or B). Suitable activators and related chemistry are described in those references cited above relating to polynucleotide synthesis, as well as in U.S. Pat. No. 6,306,599. While for simplicity the FIGS. show a head system having a single head 210 which single head has only six nozzles 220, it will be understood that in practice head 210 will usually have many more nozzles (such as more than ten, twenty, fifty, or even more than one hundred). It will also be understood that the head system can include two, three or more such heads 210 which are mounted on a same holder for movement in unison with one another (or may be mounted for independent movement).

Turning first to FIG. 5 this illustrates the co-ordination of movement and nozzle firing of a head 210 having multiple drop dispensing nozzles 220b, 220g, 220t, 220c over the first cycle of fabrication of the polynucleotides at the multiple features 160a, 160b, 160c illustrated in FIG. 4. Nozzles 220 are the outlets of pulse jets from which drops are ejected. In this situation head 210 moves in a straight line along direction 204a and ejects one drop from nozzle 220t at region 240T when that nozzle reaches an upper end 238t of a trajectory 236t. This is followed (or preceded) by a drop of activator solution from a nozzle 220b when it reaches upper end 238t. Similarly, a drop is ejected at region 240G from nozzle 220g when it reaches upper end 238g of trajectory 236g, followed (or preceded) by a drop of activator solution from a nozzle 220b. The same occurs as a nozzle 240a and 240b reach upper end 238a of trajectory 236a. When multiple cycles of an in situ synthesis are repeated in this manner, the result will be the circular features 16a, 16b, 16c as shown in FIG. 2.

FIG. 6 schematically illustrates a deposited drop pattern on substrate 10 over two cycles using the procedure of FIG. 5, for fabrication of the first two nucleotides of the polynucleotides at the multiple locations of features 16a, 16b, 16c to be formed as illustrated in FIG. 2. While only locations of features 16a, 16b, 16c will be discussed for simplicity, it will be understood that drops are deposited during each cycle at further feature locations in an analogous manner. Specifically, in the first cycle in FIG. 5 orifices on a drop deposition head 210 deposit respective single drops 240T, 240G, 240A of phosphoramidite monomer solution at locations 16a, 16b, 16c, respectively on substrate 10. Note that in FIG. 5 deposited drops 240 of a drop set for any given one of the features are shown as only somewhat overlapping for clarity, whereas in conventional practice the aim is has been to have all drops at a feature location completely overlap each other. This is followed, or preceded, by dispensing of a drop 240B of activator solution in the same cycle. As a result, a T, G, or A monomer becomes attached to locations 16a, 16b, or 16c, respectively, as seen in FIG. 3. All locations on substrate 10 may then be exposed simultaneously (by flowing across the surface) to reagents for phosphite oxidation, deblocking, and optionally capping, in a known manner. The same movement and drop dispensing is repeated in a second cycle in FIG. 5 except that a single drop 240G, 240C, 240T of corresponding phosphoramidite containing monomer is deposited at locations 16a, 16b, 16c, respectively. This is followed, or preceded, by dispensing of a drop of activator solution from an orifice 220B, in the second cycle. Further cycles are performed as required at all feature locations for the array 12 until array 12 is fabricated.

The result of the conventional practice of FIGS. 5 and 6 will be to produce circular features 16a, 16b, 16c and the like as shown in FIG. 2. Even if multiple drops of a same reagent were to be ejected from a same nozzle during a same cycle instead of the single drop described, if such multiple drops are all ejected too close to the same position 238 of each trajectory 236 the result will still be features which are circular, or close to circular, in shape. However, a method of the present invention produces elongated features as will now be described in connection with FIGS. 7 and 8A–8C.

Figure 7:
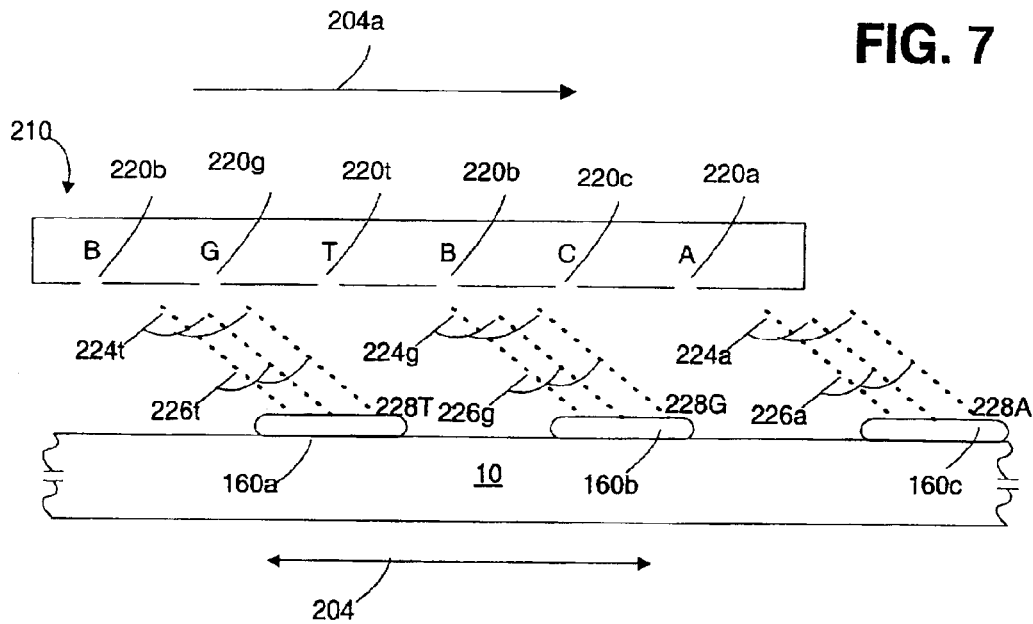
FIG. 7 is similar to FIG. 5 but using a method of the present invention to link a first nucleotide on some features of the array of FIG. 4.

In particular, FIG. 7 shows a method of the present invention over a single cycle. This method is similar to that of FIGS. 5 and 6 except that in this method multiple drops of a same phosphoramidite reagent are deposited from a same nozzle while head 210 is moving along a same straight line with respect to substrate 10. Head 210 is again moved in a line in direction 204a (one of the lines in the raster formed by scanning head 210 along axis 204 as discussed below). In particular when a nozzle 220t is aligned with each of the three upper ends 224t of trajectory 226t it ejects a drop of T phosphoramidite reagent along each of those three trajectories onto the location of feature 160a (that is, a set of three T phosphoramite drops are ejected onto the feature 160a to be formed). When a nozzle 220b is aligned with each of the three upper ends 224t of trajectory 226t it ejects a drop of activator reagent along each of those trajectories onto the location of feature 160a (that is, a set of three activator drops are ejected onto the feature 160a to be formed). The deposition of activator may occur before or after the deposition of any phosphoramidite reagent. Similarly, when a nozzle 220g is aligned with each of the three upper ends 224g of trajectory 226git ejects s a drop of G phosphoramidite reagent along each of those trajectories onto the location of feature 160b. When a nozzle 220b is aligned with each of the three upper ends 224g of trajectory 226git ejects a drop of activator reagent along each of those trajectories onto the location of feature 160b. When a nozzle 220a is aligned with each of the three upper ends 224a of trajectory 226a it ejects a drop of A phosphoramidite reagent along each of those trajectories onto the location of feature 160c. When a nozzle 220b is aligned with each of the three upper ends 224a of trajectory 226a it ejects a drop of activator reagent along each of those trajectories onto the location of feature 160c.

Figure 8A:
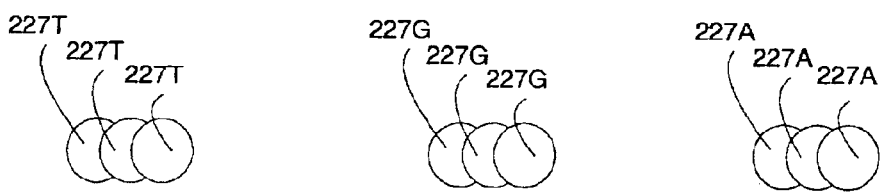
FIGS. 8A–8C schematically illustrates the sequence of drop deposition during one cycle to link the first nucleotide to some of the features of the array of FIG. 4 using the procedure illustrated in FIG. 7.
Figure 8B:
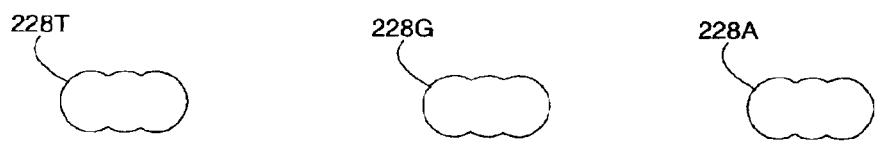
Figure 8C:
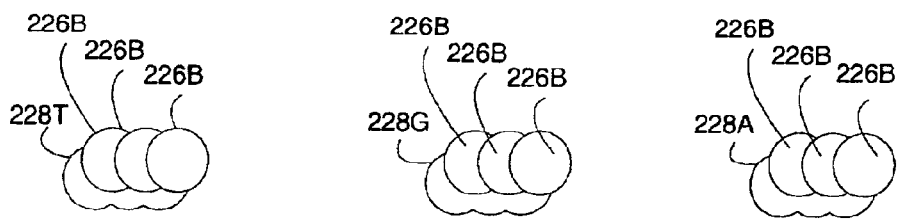

The result of the foregoing sequence will first be three overlapping deposited drops illustrated as 227T, 227G, and 227A at a corresponding feature 160a, 160b, 160c, in a manner illustrated in FIG. 8A. These deposited overlapping drops will coalesce to yield the elongated deposited regions 228T, 228G, and 228A as shown in FIG. 8B. The deposition of the three overlapping drops 226B of activator at each feature 160a, 160b, 160c during the same cycle is illustrated in FIG. 8c. However, note that drops 226B are shown as only somewhat overlapping regions 228 whereas in practice they will almost completely coincide or overlap them. Therefore, when this procedure is repeated over multiple cycles the result will be elongated features of the shape illustrate in FIG. 4. Furthermore, while in the above description multiple drops of a same composition are deposited from a same pulse jet, it is possible to deposit at least some of the drops of same composition from different pulse jets in a manner as described in allowed U.S. patent application Ser. No. 09/491,692 titled "Multiple Pass Deposition For Chemical Array Fabrication " by Jay Bass and filed Jan. 26, 2000, incorporated herein by reference. Note also that the multiple drops for a feature which are deposited from different pulse jets may include the activator containing drops which do not carry any biopolymer or biopolymer precursor (for example, they do not carry any biomonomer). For example, the multiple drops for a feature may have only one or two drops of biopolymer or biopolymer precursor containing drops, or such other number such that the elongated features are not formed absent the other of the drops which do not contain the biopolymer or biopolymer precursor.

It will be appreciated though that in order for the three same drops of a set to be overlapping and coalesce in the manner illustrated in FIGS. 8A and 8B in particular, the drop size and velocity of head 210 in direction 204*a* should be controlled. For a given distance of head 210 from front surface 11*a*, and a given size of drop ejected (which is controllable by the power pulse to each jet), an appropriate rate of deposition of the drops (firing frequency) can be determined for a given velocity of head 210 by depositing drops as the head is moved over a substrate and varying the firing frequency for a set of the same drops from a jet. The resulting deposited drops can be examined with a camera having suitable resolution, to determine the length to width ratio as a function of firing frequency. A graph or look-up table can then be constructed. This procedure can be repeated for any one or more of the following as may be desired: other head 210 velocities; drop sizes ejected; and distance of head 210 from front surface 11*a*. Thus, the head velocity and frequency of firing of each pulse jet, can be controlled to yield the desired length/width ratio since the other parameters will usually not be varied significantly during fabrication of a same array.

Figure 10:
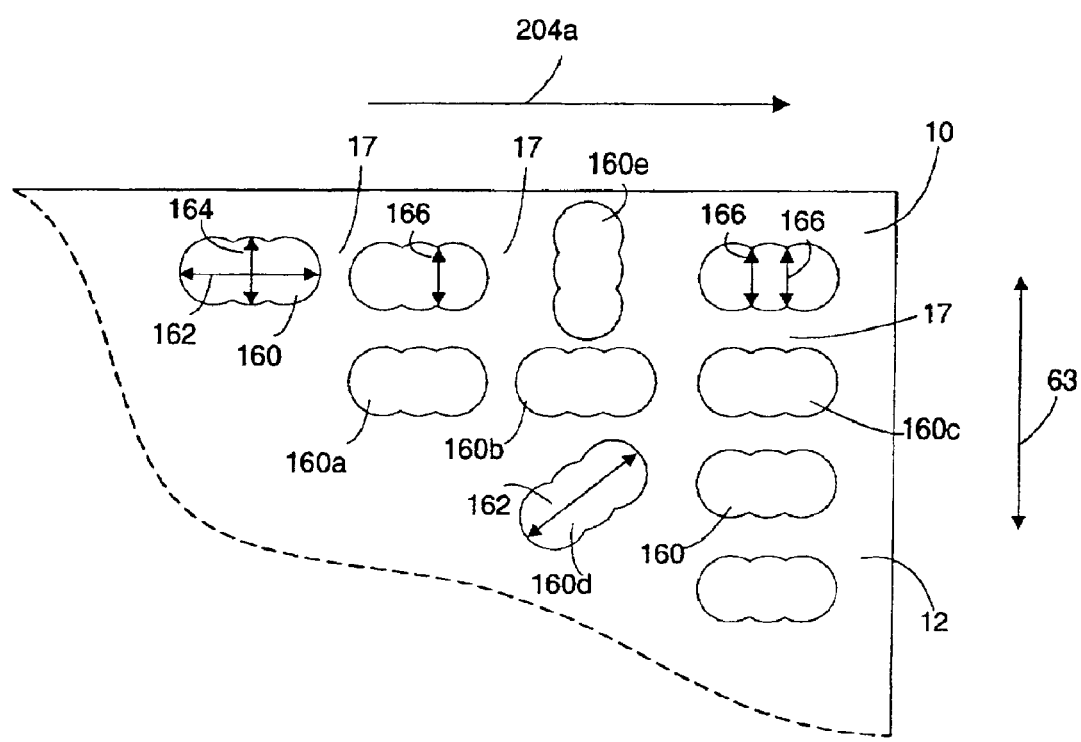
FIG. 10 is view similar to FIG. 4 of another array of the present invention showing the elongated features oriented in different directions.

Note that in FIGS. 4, 7, and 8 all features 160 have their length oriented in a same direction of travel 204*a* of head 210. This results from the multiple same overlapping droplets within each drop set deposited at a feature during a same cycle being all deposited in sequence from the same nozzle during a same straight line of travel of head 210. This can be useful in that the head velocity can be increased allowing formation of such features 160 with the foregoing orientation. However, it will be appreciated that if, for example, some of the overlapping drops in a set deposited at a feature during a same cycle are deposited from a nozzle on a line of travel parallel to a line of travel along which other of the overlapping drops in the set are deposited, elongated features can be obtained with any other orientation. This drop deposition of different drops of an overlapping set can be obtained from different nozzles of head 210 which eject the same reagent and travel simultaneously along parallel lines, or by the same nozzle after it has shifted along axis 63 to travel on a parallel line. In this configuration, even drops of different reagent from different nozzles (for example, one or more drops of a polymer precursor such as a phosphoramidite, plus one or more drops of an activator) can be used to obtain the elongated features as long as there is only partial overlap of drops in a set for a feature during a same cycle and the drops of different reagent are able to mix (for example, the activator drops are deposited before the drops containing the polymer precursor have evaporated). The result can be an array such as illustrated in FIG. 10, in which features 160*d*, 160*e* have their lengths 162 oriented in different directions from the other features 160, which directions are other than along the lines of the raster in which head 210 is scanned (note that the lines of the scanned raster lie along axis 204 as discussed below). Elongated features which are oriented in a direction different from most of the remainder of the features on an array can be used to identify locations in an array to aid in feature extraction (for example, a corner feature which is oriented differently can be readily identified during feature extraction as a location of a corner of the array).

Figure 9:
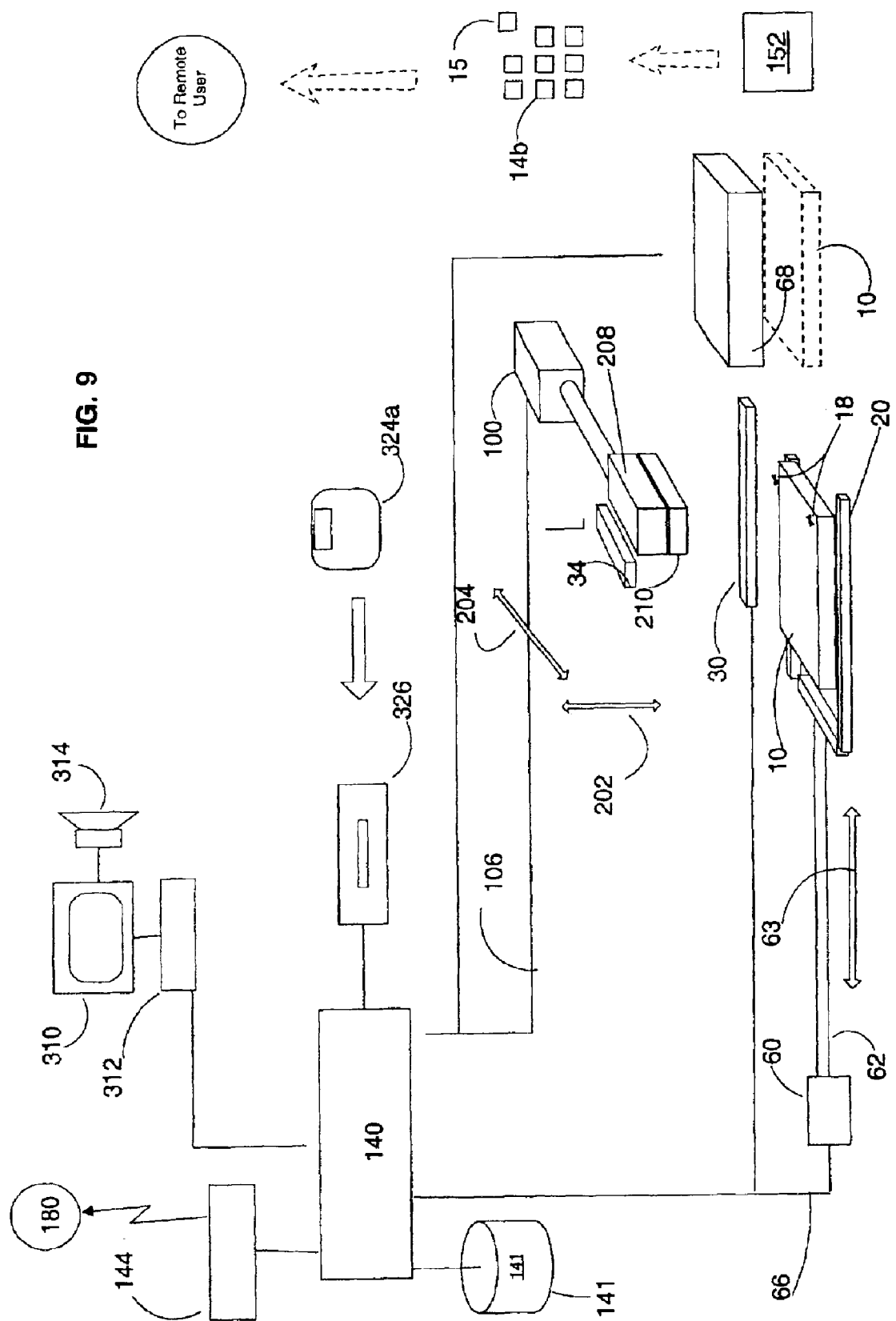
FIG. 9 schematically illustrates an apparatus of the present invention.

Referring now to FIG. 9, an apparatus of the present invention which can execute a method of the present invention, will now be described. The apparatus shown includes a substrate station 20 (sometimes referenced as a "substrate holder") on which can be mounted a substrate 10. Pins or similar means (not shown) can be provided on substrate station 20 by which to approximately align substrate 10 to a nominal position thereon (with alignment marks 18 on substrate 10 being used for more refined alignment). Substrate station 20 can include a vacuum chuck connected to a suitable vacuum source (not shown) to retain a substrate 10 without exerting too much pressure thereon, since substrate 10 is often made of glass. A flood station 68 is provided which can expose the entire surface of substrate 10, when positioned at station 68 as illustrated in broken lines in FIG. 9, to a fluid typically used in the in situ process, and to which all features must be exposed during each cycle (for example, oxidizer, deprotection agent, and wash buffer). In the case of deposition of a previously obtained polynucleotide, flood station 68 need not be present.

A dispensing head 210 is retained by a head retainer 208. As mentioned above though, the head system can include more than one head 210 retained by the same head retainer 208 so that such retained heads move in unison together. The transporter system includes a carriage 62 connected to a first transporter 60 controlled by processor 140 through line 66, and a second transporter 100 controlled by processor 140 through line 106. Transporter 60 and carriage 62 are used execute one axis positioning of station 20 (and hence mounted substrate 10) facing the dispensing head 210, by moving it in the direction of axis 63, while transporter 100 is used to provide adjustment of the position of head retainer 208 (and hence head 210) in a direction of axis 204 (and therefore move head 210 in the direction of travel 204*a* which is one direction on axis 204). In this manner, head 210 can be scanned line by line along parallel lines in a raster fashion, by scanning along a line over substrate 10 in the direction of axis 204 using transporter 100, while line to line transitioning movement of substrate 10 in a direction of axis 63 is provided by transporter 60. Transporter 60 can also move substrate holder 20 to position substrate 10 in flood station 68 (as illustrated by the substrate 10 shown in broken lines in FIG. 9). Head 210 may also optionally be moved in a vertical direction 202, by another suitable transporter (not shown) and its angle of rotation with respect to head 210 also adjusted. It will be appreciated that other scanning configurations could be used during array fabrication. It will also be appreciated that both transporters 60 and 100, or either one of them, with suitable construction, could be used to perform the foregoing scanning of head 210 with respect to substrate 10. Thus, when the present application recites "positioning", "moving", or similar, one element (such as head 210) in relation to another element (such as one of the stations 20 or substrate 10) it will be understood that any required moving can be accomplished by moving either element or a combination of both of them. The head 210, the transporter system, and processor 140 together act as the deposition system of the apparatus. An encoder 30 communicates with processor 140 to provide data on the exact location of substrate station 20 (and hence substrate 10 if positioned correctly on substrate station 20), while encoder 34 provides data on the exact location of holder 208 (and hence head 210 if positioned correctly on holder 208). Any suitable encoder, such as an optical encoder, may be used which provides data on linear position.

Processor 140 also has access through a communication module 144 to a communication channel 180 to communicate with a remote station. Communication channel 180 may, for example, be a Wide Area Network ("WAN"), telephone network, satellite network, or any other suitable communication channel.

Each of one or more heads 210 which may be present in the head system, may be of a type commonly used in an ink jet type of printer and may, for example, include five or more chambers (at least one for each of four nucleoside phosphoramidite monomers plus at least one for an activator solution) each communicating with a corresponding set of multiple drop dispensing orifices and multiple ejectors which are positioned in the chambers opposite respective orifices. Each ejector is in the form of an electrical resistor operating as a heating element under control of processor 140 (although piezoelectric elements could be used instead). Each orifice with its associated ejector and portion of the chamber, defines a corresponding pulse jet. It will be appreciated that head 210 could, for example, have more or less pulse jets as desired (for example, at least ten or at least one hundred pulse jets, with their nozzles organized in rows and columns). Application of a single electric pulse to an ejector will cause a droplet to be dispensed from a corresponding orifice. Certain elements of the head 210 can be adapted from parts of a commercially available thermal inkjet print head device available from Hewlett-Packard Co. as part no. HP51645A. A suitable head construction is described in U.S. patent application Ser. No. 09/150,507 filed Sept. 9, 1998 by Caren et al. for "Method And Multiple Reservoir Apparatus For Fabrication Of Biomolecular Arrays", incorporated herein by reference. Alternatively, multiple heads could be used instead of a single head 210, each being similar in construction to head 210 and being movable in unison by the same transporter or being provided with respective transporters under control of processor 140 for independent movement. In this alternate configuration, each head may dispense a corresponding biomonomer (for example, one of four nucleoside phosphoramidites) or an activator solution.

As is well known in the ink jet print art, the amount of fluid that is expelled in a single activation event of a pulse jet, can be controlled by changing one or more of a number of parameters, including the orifice diameter, the orifice length (thickness of the orifice member at the orifice), the size of the deposition chamber, and the size of the heating element, among others. The amount of fluid that is expelled during a single activation event is generally in the range about 0.1 to 1000 pL, usually about 0.5 to 500 pL and more usually about 1.0 to 250 pL. A typical velocity at which the fluid is expelled from the chamber is more than about 1 m/s, usually more than about 10 m/s, and may be as great as about 20 m/s or greater. As discussed above, when the orifice is in motion with respect to the substrate surface at the time an ejector is activated, the actual site of deposition of the material will not be the location that is at the moment of activation perpendicularly aligned with an orifice. However, the actual deposited location will be predictable for the given distances and velocities.

The apparatus further includes a display 310, speaker 314, and operator input device 312. Operator input device 312 may, for example, be a keyboard, mouse, or the like. Processor 140 has access to a memory 141, and controls print head 210 (specifically, the activation of the ejectors therein), operation of the transporter system, operation of each jet in print head 210, and operation of display 310 and speaker 314. Memory 141 may be any suitable device in which processor 140 can store and retrieve data, such as magnetic, optical, or solid state storage devices (including magnetic or optical disks or tape or RAM, or any other suitable device, either fixed or portable). Processor 140 may include a general purpose digital microprocessor suitably programmed from a computer readable medium carrying necessary program code, to execute all of the steps required by the present invention, or any hardware or software combination which will perform those or equivalent steps. The programming can be provided remotely to processor 141 through communication channel 180, or previously saved in a computer program product such as memory 141 or some other portable or fixed computer readable storage medium using any of those devices mentioned below in connection with memory 141. For example, a magnetic or optical disk 324a may carry the programming, and can be read by disk writer/reader 326. A cutter 152 is provided to cut substrate 10 into individual array units 15 each carrying a corresponding array 12.

The operation of the fabrication station will now be described. It will be assumed that a substrate 10 on which arrays 12 are to be fabricated, is in position on station 20 and that processor 140 is programmed with the necessary layout information to fabricate target arrays 12. Using information such as the foregoing target layout and the number and location of drop dispensers in head 210, processor 140 can then determine a reagent drop deposition pattern. Alternatively, such a pattern could have been determined by another processor (such as a remote processor) and communicated to memory 141 through communication channel 180 or by forwarding a portable storage medium carrying such pattern data for reading by reader/writer 326. Processor 140 controls fabrication, in accordance with the deposition pattern, to generate the one or more arrays 12 on substrate 10 by depositing for each target feature during each cycle, a reagent drop set as previously described. Drops are deposited from the head while moving along each line of the raster during scanning. No drops are dispensed for features or otherwise during line transitioning. Processor 140 also sends substrate 10 to flood station 68 for cycle intervening or final steps as required, all in accordance with the conventional in situ polynucleotide array fabrication process described above. The substrate 10 is then sent to a cutter 152 wherein portions of substrate 10 carrying one ore more arrays 12 are separated from the remainder of substrate 10, to provide multiple array units 15 each with one or more arrays 12. One or more array units 15 may then be forwarded to one or more remote users. Processor 140 also causes deposition of drops from all multi-dispenser drop groups to be deposited at separate test locations, such as at a test pattern 250 which may be separate from arrays 12 as already described above. The foregoing array fabrication sequence can be repeated at the fabrication station as desired for multiple substrates 10 in turn.

During array fabrication errors can be monitored and used in any of the manners described in U.S. Patent Application "Polynucleotide Array Fabrication" by Caren et al., Ser. No. 09/302898 filed Apr. 30, 1999, and U.S. Pat. No. 6,232,072. Optionally characteristics of the fabricated arrays can be included in a code applied to the array substrate or a housing, or a file linkable to such code, in a manner as described in the foregoing patent application and U.S. Pat. No. 6,180,351. As mentioned above, these references are incorporated herein by reference.

Following receipt by a user of an array according to the present invention, it will typically be exposed to a contiguous layer of a same sample (for example, a fluorescently labeled polynucleotide or protein containing sample) and the array then read. Reading of the array may be accomplished by illuminating the array and reading the location and intensity of resulting fluorescence at each feature of the array,. For example, a scanner may be used for this purpose which is similar to the AGILENT MICROARRAY SCANNER manufactured by Agilent Technologies, Palo Alto, Calif. Other suitable apparatus and methods are described in U.S. patent applications: Ser. No. 09/846125 "Reading Multi-Featured Arrays" by Dorsel et al.; and allowed application Ser. No. 09/430214 "Interrogating Multi-Featured Arrays" by Dorsel et al. As previously mentioned, these references are incorporated herein by reference. However, arrays may be read by any other method or apparatus than the foregoing, with other reading methods including other optical techniques (for example, detecting chemiluminescent or electroluminescent labels) or electrical techniques (where each feature is provided with an electrode to detect hybridization at that feature in a manner disclosed in U.S. Pat. No. 6,251,685, U.S. Pat. No. 6,221,583 and elsewhere). Feature extraction (in which features and their corresponding signals are identified in an image of a read array) can be performed using procedures such as described in U.S. patent applications Ser. Nos. 09/589046, 09/659415 and 10/086839, all under the title "Method And System For Extracting Data From Surface Array Deposited Features". Results from the reading may be raw results (such as fluorescence intensity readings for each feature in one or more color channels) or may be processed results such as obtained by rejecting a reading for a feature which is below a predetermined threshold and/or forming conclusions based on the pattern read from the array (such as whether or not a particular target sequence may have been present in the sample, or whether or not a pattern indicates a particular condition of an organism from which the sample came). The results of the reading (processed or not) may be forwarded (such as by communication) to a remote location if desired, and received there for further use (such as further processing).

In a variation of the above, it is possible that each unit 15 may be contained with a suitable housing. Such a housing may include a closed chamber accessible through one or more ports normally closed by septa, which carries the substrate 10.

Modifications in the particular embodiments described above are, of course, possible. For example, each unit 15 may be contained with a suitable housing. Such a housing may include a closed chamber accessible through one or more ports normally closed by septa, which carries the substrate 10. Where a pattern of arrays is desired, any of a variety of geometries may be constructed other than the organized rows and columns of arrays 12 of FIG 1. For example, arrays 12 can be arranged in a series of curvilinear rows across the substrate surface (for example, a series of concentric circles or semi-circles of spots), and the like. The length of the elongated features could be oriented along these or the linear rows described above, or at any angle thereto as described above in connection with linear rows of features. Similarly, as mentioned, the pattern of features 16 may be varied from the organized rows and columns of spots in FIG. 2 to include, for example, a series of curvilinear rows across the substrate surface(for example, a series of concentric circles or semi-circles of spots), and the like.

The substrate surface onto which the polynucleotide compositions or other moieties is deposited may be porous or non-porous, smooth or substantially planar, or have irregularities, such as depressions or elevations. The surface may be modified with one or more different layers of compounds that serve to modify the properties of the surface in a desirable manner. Such modification layers, when present, will generally range in thickness from a monomolecular thickness to about 1 mm, usually from a monomolecular thickness to about 0.1 mm and more usually from a monomolecular thickness to about 0.001 mm. Modification layers of interest include: inorganic and organic layers such as metals, metal oxides, polymers, small organic molecules and the like. Polymeric layers of interest include layers of: peptides, proteins, polynucleic acids or mimetics thereof (for example, peptide nucleic acids and the like); polysaccharides, phospholipids, polyurethanes, polyesters, polycarbonates, polyureas, polyamides, polyethyleneamines, polyarylene sulfides, polysiloxanes, polyimides, polyacetates, and the like, where the polymers may be hetero- or homopolymeric, and may or may not have separate functional moieties attached thereto (for example, conjugated).

Various further modifications to the particular embodiments described above are, of course, possible. Accordingly, the present invention is not limited to the particular embodiments described in detail above.

What is claimed is:

1. An addressable array having multiple biopolymer features on a substrate, wherein a majority of the features are elongated features which have a length/width ratio that is greater than 1.3 and have a narrower portion of the width which is intermediate wider portions, wherein each feature of said array comprises multiple copies of a biopolymer and wherein the lengths of at least a majority of the elongated features are orientated in a common direction, and at least some of the elongated features are oriented in different directions.

2. A biopolymer array according to claim 1 wherein the length/width ratio is greater than 1.5.

3. A biopolymer array according to claim 1 wherein the length/width ratio is greater than 3.

4. A biopolymer array according to claim 1 wherein the elongated features carry polynucleotides of different sequence.

5. A biopolymer array according to claim 1 having at least 100 of the elongated features with a length of less than 1 cm.

6. A biopolymer array according to claim 1 having at least 5000 of the elongated features with a length less than 1 mm.

7. A biopolymer array according to claim 6 having at least 5000 of the elongated features with a length less than 200 micrometers.

8. An addressable array having multiple biopolymer features on a substrate, wherein at least a majority of the features of the array are elongated features which have a length/width ratio greater than 1.3 and have a narrower portion of the width which is intermediate wider portions, and the lengths of said majority are oriented in a common direction, and wherein each feature of said array comprises multiple copies of a biopolymer and wherein the lengths of at least some of the elongated features are oriented in different directions.

9. The array of claim 8 wherein at least 60% of the features of the array are the elongated features.

10. The array of claim 8 wherein at least 70% of the features of the array are the elongated features.

11. The array of claim 8 wherein at least 80% of the features of the array are the elongated features.

12. The array of claim 8 wherein at least 90% of the features of the array are the elongated features.

13. The array of claim 8 wherein the elongated features carry polynucleotides of different sequence.

14. The array of claim 8, wherein the array includes at least 100 elongated features.

15. The array of claim 14 wherein the at least 100 elongated features have a length less than 1 cm.

16. The array of claim 8 wherein the array includes at feast 5000 elongated features.

17. The array of claim 16 wherein the at least 5000 elongated features have a length less than 1 mm.

18. The array of claim 17 wherein the at least 5000 elongated features have a length less than 200 micrometers.

19. An array having multiple biopolymer features on a substrate, including at least 100 elongated features have a length/width ratio greater than 1.3 and have a narrower portion of the width which is intermediate wider portions, and wherein each feature of said array comprises multiple copies of a biopolymer.

20. The array of claim 19 wherein the at least 100 elongated features have a length of less than 1 cm.

21. The array at claim 19 wherein the at least 100 elongated features have a length of less than 1 mm.

22. The array of claim 21 wherein the at least 100 elongated features have a length of less than 200 micrometers.

23. The array of claim 19 wherein the at least 100 elongated features carry polynucleotides of different sequence.

24. The array of claim 19 wherein at least 60% of the features of the array are the elongated features.

25. An array having multiple biopolymer features on a substrate, including at least 5000 elongated features which have a length/width ratio greater than 1.3 and have a narrower portion, which is intermediate wider portions.

26. The array of claim 25 wherein the at least 5000 elongated features have a length of less than 1 cm.

27. The array of claim 25 wherein the at least 5000 elongated features have a length of less than 1 mm.

28. The array of claim 27 wherein the at least 5000 elongated features have a length of less than 200 micrometers.

29. The array of claim 25 wherein the at least 5000 elongated features carry polynucleotides of different sequence.

30. The array of claim 24 wherein the majority of the features of the array are the elongated features.

* * * * *